US009994118B2

(12) United States Patent
Williams et al.

(10) Patent No.: US 9,994,118 B2
(45) Date of Patent: Jun. 12, 2018

(54) OPTIMIZING VEHICLE RECHARGING TO MAXIMIZE USE OF ENERGY GENERATED FROM PARTICULAR IDENTIFIED SOURCES (71) Applicant: General Motors LLC, Detroit, MI (US)

(72) Inventors: Nate Williams, Ann Arbor, MI (US);
Venkatesh Donthy, Novi, MI (US);
Paul H. Pebbles, Novi, MI (US);
Justin Roebuck, Southfield, MI (US)

(73) Assignee: General Motors LLC, Detroit, MI (US)

( * ) Notice: Subject to any disclaimer, the term of this patent is extended or adjusted under 35 U.S.C. 154(b) by 1284 days.

(21) Appl. No.: 13/904,500

(22) Filed: May 29, 2013

(65) Prior Publication Data

US 2014/0354228 A1 Dec. 4, 2014

(51) Int. Cl.
*B60L 11/18* (2006.01)

(52) U.S. Cl.
CPC ......... *B60L 11/1844* (2013.01); *B60L 11/184* (2013.01); *B60L 11/1816* (2013.01); *B60L 11/1824* (2013.01); *B60L 11/1846* (2013.01); *B60L 11/1848* (2013.01); *B60L 11/1861* (2013.01); *B60L 2200/10* (2013.01);
(Continued)

(58) Field of Classification Search
CPC .............. B60L 11/184; B60L 11/1816; B60L 11/1824; B60L 11/1844; B60L 11/1846; B60L 11/1848; B60L 11/1861; B60L 2200/10; B60L 2200/12; B60L 2200/32; B60L 2200/36; B60L 2230/16; B60L 2230/22; B60L 2230/24; B60L 2240/70; B60L 2240/622; Y02T 10/7005; Y02T 90/16; Y02T 10/7291; Y02T 10/7088; Y02T 10/7044; Y02T 10/705; Y02T 90/163; Y02T 90/162; Y02T 90/169;
(Continued)

(56) References Cited

U.S. PATENT DOCUMENTS

| 8,698,642 | B2 * | 4/2014 | Taguchi | ................... B60L 3/12 340/636.1 |
| 2009/0063680 | A1 * | 3/2009 | Bridges | ............... B60L 11/1824 709/224 |

(Continued)

*Primary Examiner* — M.N. Von Buhr
(74) *Attorney, Agent, or Firm* — Leydig, Voit & Mayer, Ltd.

(57) ABSTRACT

Implementations of the present invention contemplate utilizing a communicative infrastructure represented by a telematics unit of an electric vehicle and a telematics service provider (TSP) communicatively coupled to the telematics unit to control an amount of power reserved for a charging event of the vehicle. Specifically, the TSP utilizes information provided by the telematics unit, electrical power utilities, and electrical power metering devices to determine the characteristics of electrical energy available for charging the vehicle. The TSP can utilize the characteristics of the available energy along with additional information, such as charging preferences established by a subscriber of the TSP and vehicle use schedules, to determine an amount of power to reserve for the charging event. The amount of power reserved for the charging event may be determined based on cost, greenhouse gas emissions, a combination thereof, and on other factors.

20 Claims, 5 Drawing Sheets

(52) U.S. Cl.
CPC ....... *B60L 2200/12* (2013.01); *B60L 2200/32* (2013.01); *B60L 2200/36* (2013.01); *B60L 2230/16* (2013.01); *B60L 2230/22* (2013.01); *B60L 2230/24* (2013.01); *B60L 2240/622* (2013.01); *B60L 2240/70* (2013.01); *Y02E 60/721* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(58) Field of Classification Search
CPC ..... Y02T 90/128; Y02T 90/121; Y02T 90/14; Y04S 30/14; Y04S 10/126; Y02E 60/721
See application file for complete search history.

(56) References Cited

U.S. PATENT DOCUMENTS

| | | | | |
|---|---|---|---|---|
| 2009/0082957 A1* | 3/2009 | Agassi | ...................... | B60L 3/12 701/532 |
| 2010/0057306 A1* | 3/2010 | Ishii | ...................... | B60L 3/0084 701/48 |
| 2010/0094496 A1* | 4/2010 | Hershkovitz | ............. | B60L 3/12 701/22 |
| 2010/0164439 A1* | 7/2010 | Ido | ....................... | B60L 11/182 320/155 |
| 2010/0280675 A1* | 11/2010 | Tate, Jr. | ................ | H01M 10/44 700/295 |
| 2011/0050168 A1* | 3/2011 | Yoo | ..................... | B60L 11/1844 320/109 |
| 2011/0193522 A1* | 8/2011 | Uesugi | .................... | B60L 1/003 320/109 |
| 2011/0202221 A1* | 8/2011 | Sobue | ................... | B60K 16/00 701/22 |
| 2011/0246252 A1* | 10/2011 | Uesugi | ..................... | B60L 3/12 705/7.12 |
| 2012/0086395 A1* | 4/2012 | Kim | .................... | B60L 11/1838 320/109 |
| 2012/0112698 A1* | 5/2012 | Yoshimura | ............. | G06Q 30/04 320/109 |
| 2012/0161692 A1* | 6/2012 | Kobayashi | .......... | B60L 11/1862 320/101 |
| 2012/0166012 A1* | 6/2012 | Lee | .................... | B60L 11/1838 700/297 |
| 2012/0233077 A1* | 9/2012 | Tate, Jr. | .............. | B60L 11/1816 705/65 |
| 2012/0249065 A1* | 10/2012 | Bissonette | ............ | B60L 11/184 320/109 |
| 2013/0026986 A1* | 1/2013 | Parthasarathy | ..... | B60L 11/1838 320/109 |
| 2013/0054045 A1* | 2/2013 | Ramezani | ........... | B60L 11/1844 700/297 |
| 2013/0110296 A1* | 5/2013 | Khoo | .................. | B60L 11/1825 700/286 |
| 2013/0169226 A1* | 7/2013 | Read | ....................... | B60L 11/16 320/109 |
| 2013/0342310 A1* | 12/2013 | Park | ......................... | B60L 3/12 340/5.7 |
| 2014/0354227 A1* | 12/2014 | Tyagi | ................. | B60L 11/1844 320/109 |
| 2015/0039391 A1* | 2/2015 | Hershkovitz | .......... | G06Q 10/04 705/7.31 |

* cited by examiner

OPTIMIZING VEHICLE RECHARGING TO MAXIMIZE USE OF ENERGY GENERATED FROM PARTICULAR IDENTIFIED SOURCES

STATEMENT REAGARDING FEDERALLY SPONSORED RESEARCH OR DEVELOPMENT

The U.S. Government may have certain rights in the invention pursuant to contract numbered DE-EE0002628 awarded by the Department of Energy.

TECHNOLOGY FIELD

The present disclosure relates generally to vehicular telematics systems and more specifically to optimizing electric vehicle charging procedures through utilization of telematics units in electric vehicles and back end processing capabilities of telematics service providers.

BACKGROUND

Recent years have seen increasing household adoption of small scale electrical power production systems. Power outages have become commonplace in some parts of the world as a result of natural disasters and as the growth in demand for electricity has outstripped the growth in supply. The desire to mitigate the consequences of a failure of the electrical power grid has led some households to seek the ability to become self-sufficient from an electrical power production standpoint. Meanwhile, advances in renewable energy technologies have made small scale electrical power production more economical. As the price of electrical power supplied by electrical utilities continues to increase, household production of electrical power may become more economically advantageous. As electrical vehicles become more popular, they will not only increase household demand for electricity, they will also provide a means of storing any excess power produced by a household electrical power production device.

SUMMARY OF THE INVENTION

Implementations of the present invention contemplate utilizing a communicative infrastructure represented by a telematics unit of an electric vehicle and a telematics service provider (TSP) communicatively coupled to the telematics unit to control an amount of power reserved for a charging event of the vehicle. Specifically, the TSP utilizes information provided by the telematics unit, electrical power utilities, and electrical power metering devices to determine the characteristics of electrical energy available for charging the vehicle. The TSP can utilize the characteristics of the available energy along with additional information, such as charging preferences established by a subscriber of the TSP and vehicle use schedules, to determine an amount of power to reserve for the charging event. The amount of power reserved for the charging event may be determined based on cost, greenhouse gas emissions, a combination thereof, and on other factors. The TSP can control the maximum electrical power used to charge the vehicle by issuing instructions, e.g. to the telematics unit or to a charging station at which the vehicle acquires electrical energy, that the charging event is to proceed under the limitation that the power used during charging does not exceed the amount of power reserved for the charging event. The TSP can additionally acquire updated information pertaining to the charging event and adjust the amount of power reserved for the charging event accordingly.

One implementation consists of a method for using energy generated from identified energy sources to charge an electric vehicle, the method comprising determining, at a computer readable medium, that an electric vehicle is connected to a vehicle charging device, acquiring, at a computer readable medium, information pertaining to the amount of energy available from the identified energy sources, determining constraints on the manner in which the electric vehicle is to be charged, determining an amount of electrical power generated by the identified energy sources to be reserved for charging the vehicle during the charging event; and issuing instructions to implement a charging procedure in which the power used during charging of the electric vehicle does not exceed the amount of power reserved for charging.

An additional implementation consists of a non-transitory computer readable medium configured to execute computer executable instructions for using energy generated from identified energy sources to charge an electric vehicle, the instructions comprising instructions for determining, at a computer readable medium, that an electric vehicle is connected to a vehicle charging device, for acquiring, at a computer readable medium, information pertaining to the amount of energy available from the identified energy sources, for determining constraints on the manner in which the electric vehicle is to be charged, for determining an amount of electrical power generated by the identified energy sources to be reserved for charging the vehicle during the charging event, and for issuing instructions to implement a charging procedure in which the power used during charging of the electric vehicle does not exceed the amount of power reserved for charging.

A further implementation consists of a system for using energy generated from identified energy sources to charge an electric vehicle, the system comprising a server, configured to receive information indicating that an electric vehicle is connected to a vehicle charging device, to receive information pertaining to an amount of energy available from the identified energy sources, to determine constraints on the manner in which the electric vehicle is to be charged, to determine an amount of electrical power generated by the identified energy sources to be reserved for charging the vehicle during the charging event, and to issue instructions to implement a charging procedure in which the power used during charging of the electric vehicle does not exceed the amount of power reserved for charging, a telematics unit, configured to transmit information indicating that an electric vehicle is connected to a vehicle charging device and to receive instructions to implement a charging procedure at the electric vehicle, and a home energy management system (HEMS) configured to transmit information pertaining to the amount of energy available from the identified energy sources.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
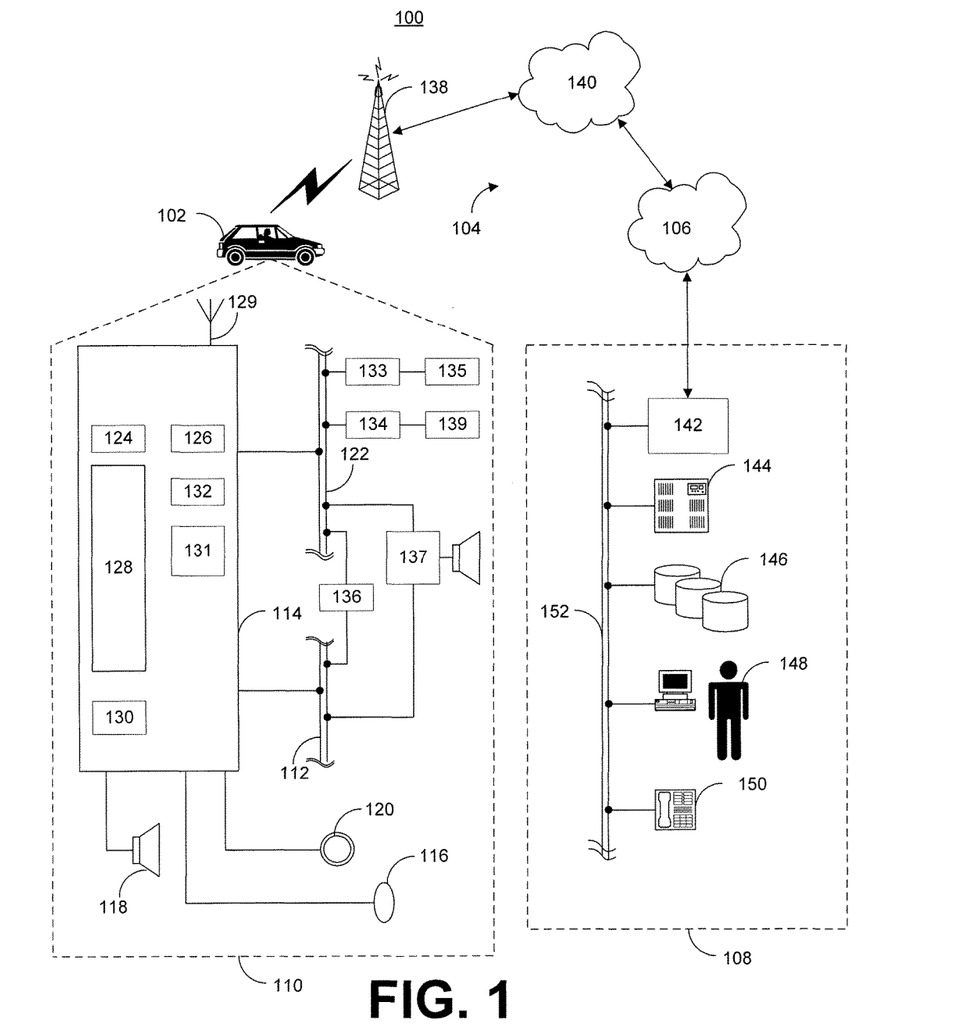
FIG. 1 is a schematic diagram of an operating environment for a mobile vehicle communication system usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108. It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. The GPS chipset/component is capable of determining the location of the vehicle with a high degree of accuracy. For example, the GPS chipset/component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a present position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for present or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to energy consumed by one or more identified energy consuming devices and data pertaining to energy produced by one or more identified energy sources can be transmitted to the telematics unit 114 via the wireless modem 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI)

technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is presently being charged), the present rate at which the battery is being charged (e.g. as a rate of change of the percentage of capacity charged per unit time), and the present amount of power drained by the battery during the charging. The vehicle sensors 139 may further include sensors for detecting and receiving information pertaining to household electrical energy production. For example, the vehicle sensors 139 may include sensors for receiving information via power line communications (PLC) from an electrical vehicle charging device. The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108 is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records, subscriber behavioral patterns, or any other pertinent subscriber information. Although the illustrated example has been described as it would be used in conjunction with a manned call center, it will be appreciated that the call center 108 can be any central or remote facility, manned or unmanned, mobile or fixed, to or from which it is desirable to exchange voice and data.

A portion of the databases 146 stores information pertaining to the identity of the telematics unit 114. For example, the databases 146 may store, for each vehicle enrolled in a program, an integrated circuit card identifier (ICCID) corresponding to the subscriber identity modules (SIMs) of the vehicle's telematics unit, an international mobile equipment identity (IMEI) corresponding to network access devices (NADs) integrated into the vehicle's telematics units, a mobile identification number (MIN), an electronic serial numbers (ESN), a mobile equipment identifier (MEID), an international mobile subscriber identity (IMSI) associated with the SIM cards of the vehicle's telematics unit, a mobile device number (MDN), a mobile station international subscriber directory number (MSISDN), a service set identifier (SSID), a media access control (MAC)

address, and an internet protocol (IP) address associated with the vehicle's telematics unit.

Additional information may also be stored in the databases 146. For example, a number of subscriber preferences may be stored at the databases 146. The subscriber preferences may include but are not limited to the desire to participate in a vehicle recharging control program, the desire to use one or more particular services or a suite of services, billing information associated with the subscriber, a schedule of anticipated usage of a vehicle associated with the subscriber, patterns of prior usage of a vehicle associated with the subscriber, user accounts with other service providers that are associated with the subscriber, subscriber contact information, the identities of one or more smart meters or charging stations associated with the subscriber, the identity of a household electrical energy production meter associated with the subscriber, and additional subscriber information may be stored in the databases 146.

The servers 144 interface with utility companies that supply electricity (not shown), databases 146, and telematics units such as the telematics unit 114. The servers 144 have processors that can be configured to request and receive information from telematics units such as the telematics unit 114, from household electrical energy production meters, from smart meters, from charging stations, and from a variety of other sources. The servers 144 may communication with the household electrical energy production meters and other electrical energy production information sources through a land network, such as land network 106, through a wireless carrier system, such as e.g., wireless carrier system 104, or through a combination of a land network and a wireless carrier system. The servers 144 may request information from the electrical energy production information sources, may receive information from the electrical energy production information sources, and store information from the electrical energy production information sources. In some implementations, information received by the servers 144 is subsequently stored in the databases 146. Furthermore, the servers 144 may communicate with utility companies that supply electricity (not shown).

Figure 2:
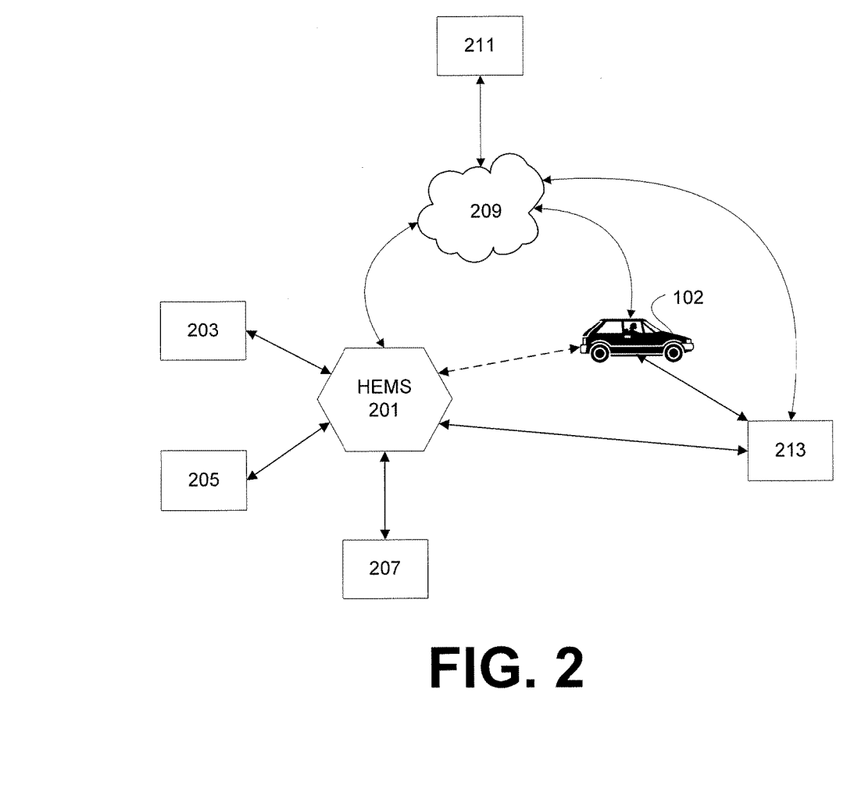
FIG. 2 is a schematic diagram of an operating environment for the charging of an electric vehicle and the transmission of information pertaining to the charging to a telematics service provider.

FIG. 2 is a schematic diagram of an operating environment for the charging of an electric vehicle and the transmission of information pertaining to the charging and the source of the electrical energy available for use during the charging to a telematics service provider (TSP). home energy management system (HEMS) 201 acquires information pertaining to energy consumed by a group of identified energy consuming devices. The group of identified energy consuming devices may be deemed to constitute a household. In some implementations, the HEMS 201 identifies the energy consuming devices. In alternative implementations, the energy consuming devices transmit information pertaining to their identities to the HEMS 201. Similarly, in some implementations the HEMS 201 defines the members of the group of identified energy consuming devices while in other implementations a different entity defines the members of the group of identified energy consuming devices and transmits the identities of the devices in the group to the HEMS 201. The group of identified energy consuming devices monitored by the HEMS 201 may include one or more local energy consuming devices 203. The HEMS 201 can provide energy consumption data in real time. In addition, the HEMS 201 may analyze data pertaining to the energy consumed by the group of identified energy consuming devices, determine patterns in energy consumption, and forecast future energy consumption attributable to the group of identified energy consuming devices.

The HEMS 201 may also acquire information pertaining to energy produced by one or more particular identified energy sources. The identified energy sources may be restricted to sources of energy that emit no pollutants or that emit less than a threshold level of pollutants. Alternatively, the identified sources may include energy sources that emit pollutants. The identified energy sources may include local energy sources 205. Examples of the local energy sources 205 include but are not limited to a solar array located at the household and a windmill located at the household. The local energy sources 205 may include but are not limited to renewable energy sources, green energy sources, energy sources that do not emit carbon dioxide, energy sources that do not pollute, or a combination thereof. In some implementations, the local energy sources 205 may also include energy sources that emit pollutants. The HEMS 201 may analyze data pertaining to the identified energy sources, such as the local energy sources 205, determine patters in energy production, and forecast future energy production attributable to the identified energy sources, such as the local energy sources 205. In addition, the HEMS 201 may be connected to local energy storage system 207. The local energy storage system 207 stores the surplus of energy generated by the local energy sources 205 that is not used by the local energy consuming devices 203. The HEMS 201 may display information related to electrical power consumption, production, and storage directly, or the HEMS 201 may be communicatively coupled to an external display device. The HEMS 201 may also upload energy consumption, production, and storage data to the Internet where it can be viewed or downloaded.

In some implementations, the HEMS 201 is also connected to electric vehicle 102. The HEMS 201 may communicate with electric vehicle 102 through power line communications (PLC), through a local area network (LAN), or otherwise. In some implementations, telematics service provider (TSP) 211 serves as a communicative intermediary between the HEMS 201 and electric vehicle 102. In such implementations, information may be sent by the HEMS 201 to the TSP 211 and forwarded on to the vehicle 102. Similarly, information may be sent by the vehicle 102 to the TSP 211 and forwarded on to the HEMS 201.

The TSP 211 can send and receive information from both the electric vehicle 102 (through a telematics unit, e.g. element 114 of FIG. 1) and the HEMS 201 through network 209. The network 209 may be a wireless network, a wired network, or may include a combination of wireless and wired networks. The TSP 211 may include one or more servers, such as servers 144, and may further include one or more databases, such as the databases 146. In some implementations, the HEMS 201 does not communicate directly with the TSP 211 but instead transmits information to a telematics unit of the vehicle 102 and the telematics unit of the vehicle 102 forwards the information on to the TSP 211. The TSP may request information from the vehicle 102, from the HEMS 201, or may request that the vehicle 102 acquire information from the HEMS 201 and subsequently provide such information to the TSP. The TSP may analyze data provided by the HEMS 201 and the vehicle 102 and determine an amount of electrical power generated by the group of identified energy sources, such as local energy sources 205, to be reserved for vehicle charging. The amount of electrical power reserved for vehicle charging will affect the rate at which electrical energy is transferred to the vehicle 102 during a charging event. In some implementations, the amount of electrical power reserved for vehicle charging is equal to the amount of electrical power by which the electrical power produced by local energy sources 205 exceeds the amount of electrical power consumed by local energy consuming devices 203. In addition, the TSP 211 may transmit instructions to the vehicle 102 or to the HEMS 201 that dictate that the charging event is conducted with an amount of electrical power that does not exceed the amount of electrical power reserved for vehicle charging.

Charging device 213 is capable of transferring energy to electric vehicle 102. In some implementations, charging device 213 is communicatively connected to the HEMS 201, to the TSP 211 through network 209, or to a both the HEMS 201 and the TSP 211.

In general terms, not intended to limit the claims, the example environment may be used by systems and methods that utilize a communicative infrastructure represented by a telematics unit of an electric vehicle and a telematics service provider (TSP) communicatively coupled to the telematics unit to control an amount of electrical power reserved for charging an electric vehicle during a charging event (i.e. the reserved charging power). Specifically, the TSP utilizes information provided by the telematics unit, electrical power utilities, and electrical power metering devices, such as a home energy management system (HEMS), to determine the characteristics of energy available from one or more identified sources for charging the vehicle at any given point in time. The TSP can utilize the characteristics of the available energy along with additional information, such as charging preferences established by a subscriber of the TSP and use schedules for the vehicle, to determine an amount of power to reserve for vehicle charging during the charging event of a portion thereof. The TSP can then control the amount of power utilized by the charging event by issuing instructions, e.g. to the telematics unit or to an HEMS, and can also acquire updated information pertaining to the charging event and adjust the amount of power reserved for the charging event accordingly.

In different implementations of the present invention, the sources of energy that are considered for use in charging the vehicle are identified by different entities. In some implementations, the TSP may identify one or more sources of energy that are linked to a controlled charging program for a particular vehicle. For example, the TSP may store information at one of databases 146 that associates a particular vehicle identifier, such as a VIN, with one or more energy sources, such as a particular solar panel. Similarly, the TSP may associate a particular vehicle identifier with a particular HEMS. In such an implementation, each energy source monitored by the HEMS may be associated with the vehicle. In addition to identifying energy sources as linked to a controlled charging program associated with a vehicle, sources may be identified as linked to a controlled charging program associated with a particular charging device or charging station. In some implementations, an HEMS may define the sources that are identified as linked to a particular controlled charging program. For example, all the sources monitored by an HEMS may be defined as the group of sources linked to a particular controlled charging program associated with a particular vehicle or with a particular charging device.

The TSP may consider a variety of information pertaining to the energy consumption and production attributable to energy consuming devices and energy sources to determine the amount of power to reserve for a charging event. For example, the TSP may consider the energy consumption and production at a particular point in time, and determine that the amount of power to be reserved for the charging event is equivalent to the amount by which local power production (e.g. power produced by a particular set of identified energy sources) exceeds local power consumption (e.g. power consumed by a particular set of identified energy consuming devices). Alternatively, an HEMS may dictate that some threshold level of energy production should be stored at a local energy storage device and should not be used to charge the electric vehicle, and the TSP may thus determine that the amount of power to be reserved for the charging event is less than the amount by which local power production exceeds local power consumption. In some implementations, the TSP may also periodically request updated information from a local power production and consumption metering system, such as an HEMS. In such implementations, the TSP may recalculate the amount of power to be reserved for the charging event based upon the updated information. In some implementations, the TSP will only recalculate the optimal amount of power reserved for the charging event if the updated information varies from the previously obtained information by a threshold amount. In some implementations, the information sources may push information to the TSP upon the occurrence of certain conditions. For example an HEMS may push information pertaining to local power production and consumption if the difference between local power produced and local power consumed changes by a threshold amount relative to the last data point obtained by the TSP. Similarly, a telematics unit may push information to the TSP if the electric vehicle acquires a threshold battery charge level.

In some implementations, the TSP may utilize forecasts of future energy production and consumption and forecasts of future electric vehicle usage to determine an amount of electrical power to be reserved for charging the electric vehicle during a charging event. In such implementations, the amount of electrical power reserved for charging the electric vehicle may be determined based on a desire to minimize a household's financial cost of energy. Similarly, the amount of electrical power reserved for charging the electric vehicle may be determined based on a desire to limit the amount of carbon dioxide emissions or to limit the amount of other chemicals or pollutants emitted during the production of the energy used to charge the electric vehicle. The TSP may acquire forecasts of future energy production and consumption from an HEMS, or the TSP may generate forecasts of future energy production and consumption based on data provided by an HEMS, based on data provided by another electrical power metering system, or based on data from other sources. For example, the TSP may account for weather forecasts and determine that less energy will be available from an identified source as a result of increased consumption of energy produced by that source due to the above average temperatures. The TSP may also forecast anticipated usage of an electric vehicle based upon information provided by a telematics unit in the vehicle or based on information provided by some other informational source. For example, the TSP may have access to a calendar application linked to a subscriber account and determine that the vehicle will be needed at a particular time for travel to a particular location. The TSP can use anticipated usage information to determine a threshold level of charge needed by the vehicle at future points in time and adjust the amount of electrical power reserved for charging the electric vehicle accordingly.

Figure 3:
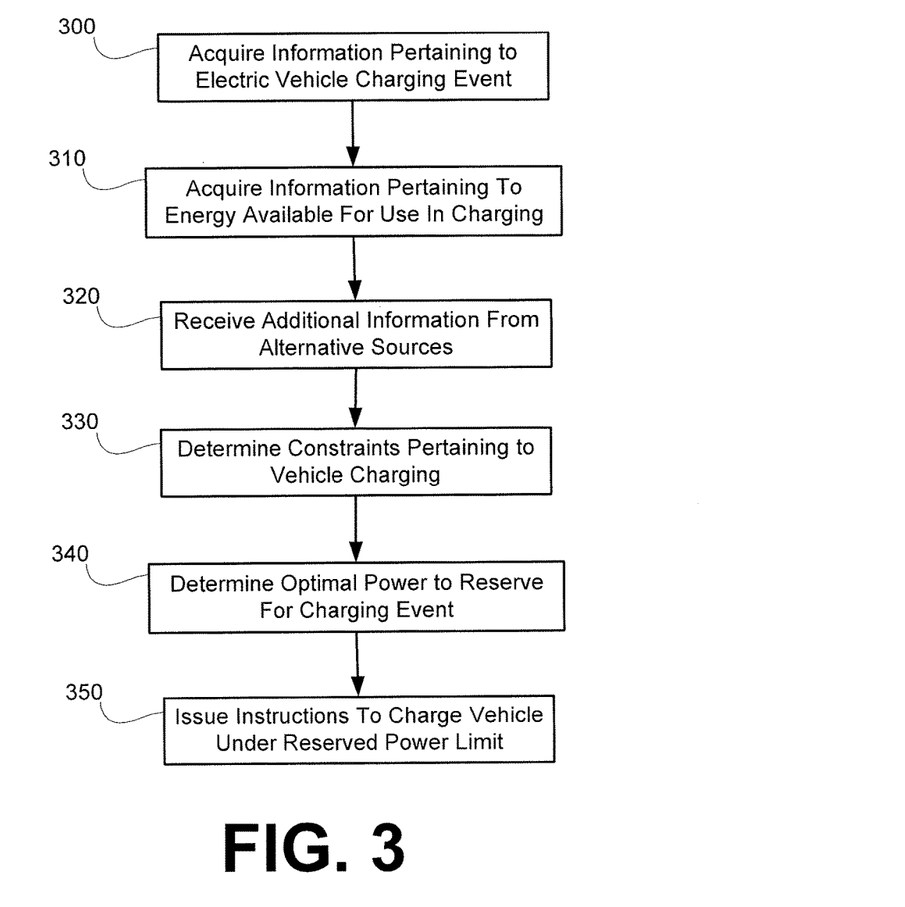
FIG. 3 is a flow chart summarizing a process for acquiring information pertaining to the charging of an electric vehicle and for controlling the amount of electrical power reserved for charging the vehicle.

Turning now to FIG. 3, a flow chart is depicted that summarizes a process implemented by a telematics service provider (TSP) for acquiring information pertaining to the charging of an electric vehicle and for controlling the amount of power reserved for charging the vehicle. At step 300, the TSP 211 acquires information pertaining to the charging event of vehicle 102 from telematics unit 114. The information received by the TSP 211 may include but is not limited to a vehicle identification number (VIN), an integrated circuit card identifier (ICCID) corresponding to the subscriber identity module (SIM) of the telematics unit 114, an international mobile equipment identity (IMEI) corresponding to a network access device (NAD) integrated into the telematics unit 114, a mobile identification number (MIN), an electronic serial number (ESN), a mobile equipment identifier (MEID), an international mobile subscriber identity (IMSI) associated with the SIM card of the telematics unit 114, a mobile device number (MDN), a mobile station international subscriber directory number (MSISDN), a service set identifier (SSID), a media access control (MAC) address associated with the telematics unit 114, and an internet protocol (IP) address associated with the telematics unit 114. The information received by the TSP 211 at step 300 may further comprise information pertaining to the time at which the charging event began, the charge level of the vehicle battery (e.g. in kWh or percent of charge capacity), the rate of charge of the battery (e.g. in kW), the electrical current (e.g. in Amps) from the charging device, the electrical potential difference between the charging device and the battery (e.g. in Volts), and the amount of electrical power presently being drained from the charging device by the battery (e.g. in kW).

At step 310, the TSP 211 receives information pertaining to the electrical energy available from identified sources for use in charging the vehicle. The sources may be identified by home energy management system (HEMS), such as HEMS 201, by the TSP 211, or by the telematics unit 114. The information received by the TSP 211 may be transmitted to the TSP in response to the TSP first requesting such information. Alternatively, the information may be pushed to the TSP by an information source. Information sources include but are not limited to energy power metering systems such as the HEMS 201. The information received by the TSP 211 at step 310 may include but is not limited to a present power consumption attributable to a set of identified energy consuming devices, a present power production attributable to a set of identified energy sources, a present level of electrical energy stored at identified energy storage devices, a forecast of future energy consumption attributable to energy consuming devices, a forecast of future energy production attributable to identified energy sources, a forecast of future energy available from identified energy storage devices, data pertaining to past consumption of energy by identified energy consuming devices, and data pertaining to past production of energy by identified energy sources.

At step 320, the TSP 211 receives additional information from alternative information sources. Alternative information sources may include but are not limited to an electrical energy utility, a weather service, a subscriber account, a calendar application associated with a subscriber account, and a user account held by a different service provider associated with a subscriber account. The additional information received at step 320 may include but is not limited to a present price of electrical power (e.g. in $/kWh), a forecasted future price of electrical power (e.g. in $/kWh), a present amount of energy generated from renewable sources that is available from an electric utility, a forecast of the amount of energy generated from renewable sources that will be available from an electric utility in the future, present weather conditions, a forecast of future weather conditions, information pertaining to future demand for electricity, data pertaining to previous supply and demand for electricity, a scheduled event of a subscriber, an anticipated vehicle use schedule, and information pertaining to the prior usage of a vehicle.

At step 330, the TSP 211 determines constraints pertaining to a charging event of electric vehicle 102. Constraints may be established by subscriber preferences and may also be determined according to anticipated energy usage of identified energy consuming devices, anticipated energy production attributable to identified energy sources, and anticipated travel needs of a subscriber. For example, information provided by an HEMS may indicate that identified energy consuming devices will require a certain level of electrical power for a period of time during which the vehicle is charging, information provided by a subscriber's calendar application may indicate that the vehicle must have a sufficient level of charge to travel a particular distance at a particular point in time, and subscriber preferences may dictate that the vehicle is only permitted to utilize energy generated from one or more identified energy sources during a charging event. Constraints determined by the TSP at 211 may take a number of different forms. For example, a constraint requiring that vehicle 102 have a certain level of energy stored in a battery at a particular point in time may be determined. Similarly, a constraint requiring that an identified energy storage device have a certain threshold level of stored energy at a particular point in time may also be determined. Constraints pertaining to the price of electricity may also be determined. For example, a constraint requiring that a household not utilize electrical energy from the grid when prices exceed $0.15/kWh.

At step 340, the TSP 211 determines an amount of electrical power to be reserved for charging the vehicle 102. In some implementations, the amount of electrical power to be reserved for charging the vehicle 102 is an amount of power that can be transferred to an energy storage device of the vehicle 102 that will allow all constraints are complied with throughout the charging event. In implementations where it is impossible for all constraints to be complied with throughout the charging event, the amount of electrical power reserved for charging the vehicle 102 may be an amount of power that can be transferred to an energy storage device of the vehicle 102 in order that the greatest number of constraints may be complied with throughout the charging process or that enables a hierarchy of charging constraints to be upheld. In some implementations, a scoring system may be used wherein compliance with various constraints is granted a score and the amount of power reserved for the charging event is an amount that enables a threshold score to be awarded to the charging event.

At step 350, the TSP 211 issues instructions to proceed with a charging event during which the power used to charge the vehicle never exceeds the amount of power reserved for the charging event as identified at step 340. In some implementations, the TSP issues the instructions to the telematics unit 114 of the vehicle 102. In other implementations, the TSP issues the instructions to a charging device, such as an electric vehicle charging system or electric vehicle supply equipment (EVSE). The TSP may alternatively issue the instructions to an HEMS.

Figure 4:
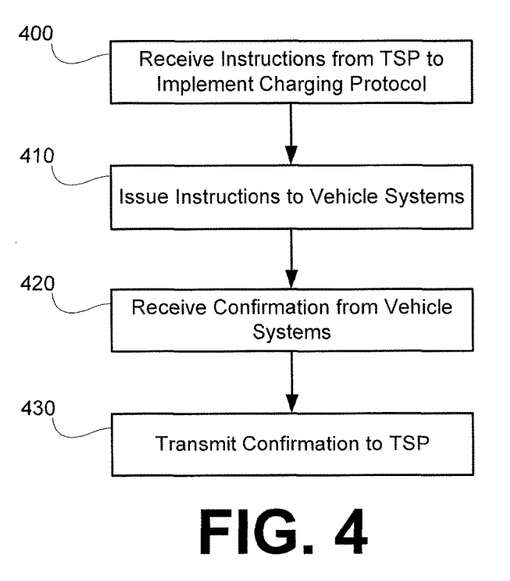
FIG. 4 is a flow chart summarizing a process for dictating the amount of electrical power reserved for charging the vehicle during a charging event.

FIG. 4 is a flow chart summarizing a process for dictating the amount of electrical power reserved for charging the vehicle during a charging event. At step 400, telematics unit 114 of vehicle 102 receives instructions from TSP 211 to implement a charging protocol. The instruction provided by the TSP 211 may include instructions to maintain a particular electrical potential at a charging device, to charge at a particular voltage or to charge at a range of voltages not exceeding a particular voltage limit, to charge at a particular current flow or at a range of current flows not exceeding a particular current flow limit, or to charge at a range of electrical powers not exceeding a particular power limit. The instructions provided by the TSP 211 may also instruct the vehicle to charge according to a protocol wherein the amount of power drained by the vehicle during charging does not exceed an amount of power reserved for the charging event. The instructions provided by the TSP may allow for the amount of power reserved for the charging event to be varied at different times during the charging event. The instructions received by the telematics unit at step 400 may also include instructions for the telematics unit 114 to transmit information to the TSP 211 upon the achievement of certain charging milestones. For example, the instructions received by the telematics unit 114 at step 400 may include instructions to notify the TSP 211 when the vehicle has reached sixty percent of charge capacity.

At step 410, the telematics unit 114 issues instructions to vehicle systems corresponding to the instructions sent from the TSP 211. At step 420, the telematics unit 114 receives confirmation from the vehicle systems that the instructions issued at step 410 are acknowledged and are being complied with. In some implementations, the instructions issued by telematics unit 114 may request that a vehicle system transmit a notification upon the occurrence of a condition. For example the instructions issued at step 410 may direct a battery capacity sensor to inform telematics unit 114 that the battery has reached a particular percentage capacity. At step 430, the telematics unit transmits a confirmation to the TSP 211 that the charging protocol requested by the TSP is being or has been implemented. In some implementations, an indication that the charging event has completed is transmitted at step 430.

Figure 5:
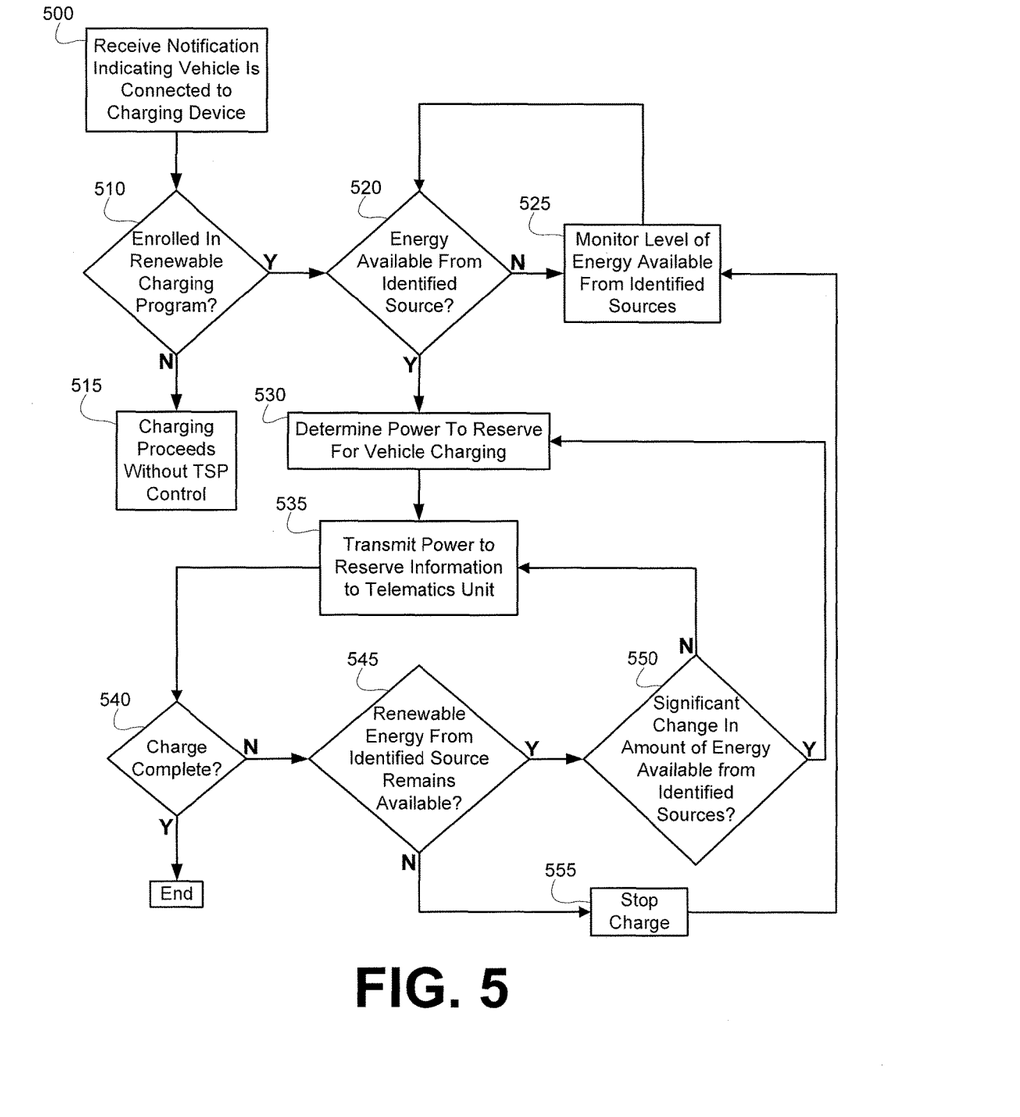
FIG. 5 is a flow chart summarizing a process for monitoring information pertaining to the charging of an electric vehicle and for controlling the amount of electrical power reserved for charging the vehicle.

FIG. 5 is a flow chart summarizing a process for monitoring information pertaining to the charging of an electric vehicle and for controlling the amount of electrical power reserved for charging the vehicle. At step 500, the TSP 211 receives a notification that vehicle 102 has been connected to a charging device. The notification may be sent as a result of a telematics unit 114 being configured to transmit a notification to the TSP 211 in response to detecting that the vehicle 102 has become connected to a charging device. In some implementations, the telematics unit 114 may be configured to send such a notification only when the vehicle 102 is connected to a particular charging device. For example, in some implementations, a notification will only be sent when the vehicle 102 is connected to a charging device identified as the vehicle's household charging station and will not be sent when the vehicle 102 connects to any other charging device, such as a charging device at a commercial charging station. In other implementations, the telematics unit 114 may be configured to send a notification in response to determining that a home energy management system (HEMS), such as HEMS 201, is linked to the charging device to which the vehicle has been connected.

At step 510, the TSP determines whether or not the subscriber account associated with either the vehicle 102 or the charging device is enrolled in a controlled charging program. If enrollment in a controlled charging program is identified, the process proceeds to step 520. In some implementations, it is sufficient for either the vehicle 102 or the charging device to be enrolled in a controlled charging program for the process to proceed to step 520. In other implementations the enrollment of one of either the vehicle or the charging device is controlling. For example, if the enrollment of the vehicle is controlling, then if the vehicle is not enrolled in a controlled charging program but the charging device is enrolled, the process will not proceed to step 520 but will instead proceed to step 515. In some implementations, both the vehicle 102 and the charging device must be enrolled in the controlled charging program for the process to proceed to step 520. If appropriate enrollment in a controlled charging program is not detected, or if it is determined that a controlling element is not enrolled in a controlled charging program, the process proceeds to step 515. At step 515 charging proceeds without control from the TSP 211.

At step 520, the process determines whether or not there is energy available from one or more identified energy sources. The identity of the energy sources from which the process determines whether there is energy available may be described by the telematics unit 114 or by an HEMS. Alternatively, the identity of the energy sources to be considered in the controlled charging program may be stored by the TSP 211, for example at one of databases 146. Determining whether or not there is renewable energy available from one or more identified energy sources may involve requesting information from the HEMS 201, receiving information from the HEMS 201, and determining whether or not the HEMS 201 indicates that energy from identified energy sources is available for use in charging the electric vehicle 102. If it is determined that there is no energy produced by the identified sources available for use in charging the vehicle 102, the process proceeds to step 525. At step 525, the TSP 211 begins to monitor the level of energy available from the identified sources. In some implementations, the monitoring performed by the TSP at step 525 involves the TSP 211 sending periodic queries to the HEMS 201 requesting that the HEMS 201 return the amount of energy available from the identified sources. The frequency with which the queries are transmitted to the HEMS 201 may depend on the last reported value of energy available for use in vehicle charging from the identified sources. In other implementations, the monitoring performed by the TSP 211 at step 525 involves waiting for an indication from the HEMS 201 that energy produced by the identified sources has become available for charging.

If it is determined that energy from the identified sources is available for use in charging the electric vehicle, the process proceeds to step 530. At step 530, the TSP 211 determines an optimal amount of power reserved for the charging event based on information pertaining to the charging event. Information considered by the TSP 211 in determining an amount of power reserved for the charging event includes but is not limited to the types of information received by the TSP 211 at steps 300, 310, and 320 of the process depicted by FIG. 3. In determining the amount of power reserved for the charging event at step 530, the TSP 211 performs considerations and calculations including but not limited to those identified at steps 330 and 340 of the process depicted by FIG. 3. Also at step 530, the TSP 211 transmits information pertaining to the calculated amount of power to be reserved for the charging event to the telematics unit 114.

At step 535, the TSP 211 transmits information to the telematics unit 114 pertaining to the amount of power to be reserved for the charging event as calculated by the TSP 211 at step 530. At step 535, the TSP 211 further directs the vehicle 102 to proceed with a charging event at which the power used during charging does not exceed the amount of power reserved for the charging event. At step 540, the TSP 211 determines whether or not charging of the vehicle 102 has completed. Determining that charging has completed may involve sending a query regarding that state of charge in the vehicle 102 to the telematics unit 114 and receiving a response from the telematics unit 114. Alternatively, the telematics unit 114 or the charging device may be configured to transmit push notifications to the TSP 211 upon the charge level of the vehicle reaching a particular threshold or upon the occurrence of other conditions. Determining that charging has completed may therefore also involve analyzing one or more push notifications received from the telematics unit 114 or from the charging device and determining, based on the information contained in the push notifications that charging of the vehicle 102 has been completed. If charging has been completed, the process ends. If charging has not been completed, the process proceeds to step 545.

At step 545, the TSP 211 determines whether or not there continues to be energy from the identified sources available for charging the vehicle. The determination made by the TSP 211 at step 545 involves consideration of the same types of information that were considered at step 520 and involves the application of the same rules that were applied at step 520. However, the determination made by the TSP 211 at step 545 involves utilizing updated data that is acquired by the TSP 211 during step 545. After step 535 has been completed, the combination of steps 540 and 545 may be triggered by different mechanisms in different implementations. In some implementations, steps 540 and 545 are triggered by the passing of a particular period of time since the completion of step 520. In other implementations, steps 540 and 545 are triggered by information being transmitted to the TSP 211. For example, steps 540 and 545 may be triggered by the transmission of information to the TSP 211 that indicates that the difference between the power produced by the identified energy sources and the power consumed by identified energy consuming devices has changed by a threshold amount relative to that identified by the TSP at step 520.

If at step 545 it is determined that there continues to be energy from identified sources available for charging the vehicle, the process proceeds to step 550 where it is determined whether or not the amount of energy available from the identified sources has changed significantly between steps 520 and 545. A change in the amount of energy available may be deemed to be significant if the amount of energy changes by a threshold amount. The threshold amount may be defined by a percentage of the amount of energy available from identified sources as determined at step 520. If it is determined at step 550 that the amount of energy has changed significantly, the process returns to step 530. However, if it is determined at step 550 that the amount of energy has not changed significantly, the process returns to step 535.

On the other hand, if at step 545 it is determined that there is no longer energy from identified sources available for vehicle charging, the process proceeds first to step 555 where charging is stopped and subsequently proceeds back to step 525.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operation performed at the call center may be carried out according to stored instructions or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for using electrical power provided by a set of identified electrical energy sources to electrically charge an electric vehicle, the method comprising:
   determining, at a computer readable medium, that the electric vehicle is connected to an electric vehicle charging device;
   acquiring, from a computer readable medium, information pertaining to availability of the electrical power provided by the set of identified energy sources;
   determining constraints on electrically charging the electric vehicle during an electrical charging event;
   determining, based upon the constraints on electrical charging a reserved amount of electrical power to be reserved for electrically charging the vehicle during the electrical charging event; and
   issuing instructions to implement an electric charging procedure during the electrical charging event for providing power during the electric charging procedure at a power level that does not exceed the reserved amount of electrical power.

2. The method of claim 1, wherein determining that the electric vehicle is connected to the electric vehicle charging device comprises receiving an indication that a vehicle is connected to a vehicle charging device from one of the group consisting of: a telematics unit in the vehicle, the charging device to which the vehicle is connected, and an electrical power metering device.

3. The method of claim 2, wherein the electrical power metering device is a home energy management system (HEMS).

4. The method of claim 1, wherein acquiring information pertaining to availability of the electrical power provided by the set of identified energy sources comprises receiving data pertaining to a present level of power consumption attributable to identified energy consuming devices and data pertaining to a present level of power production attributable to the identified energy sources.

5. The method of claim 1, wherein acquiring information pertaining to availability of the electrical power provided by the set of identified energy sources comprises receiving data pertaining to a forecast of future levels of power consumption attributable to identified energy consuming devices and data pertaining to a future level of power production attributable to the identified energy sources.

6. The method of claim 4, wherein the data pertaining to a present level of power consumption and the data pertaining to a present level of power production is received from a home energy management system (HEMS).

7. The method of claim 1, wherein the information pertaining to availability of the electrical power provided by the set of identified energy sources comprises information pertaining to an amount of energy stored at an identified energy storage device.

8. The method of claim 1, wherein the constraints on electrically charging the electric vehicle during an electrical charging event include one of the group consisting of: a maximum electrical power transferred to the vehicle during charging; a minimum electrical power transferred to the vehicle during charging; a maximum duration of the charging; a minimum duration of the charging; a minimum charge level that must be achieved during charging; a minimum charge level that must be achieved by a particular point in time; a maximum amount of energy not generated by the identified energy sources used to charge the vehicle; and a maximum cost of electricity used to charge the vehicle.

9. The method of claim 1, wherein determining the reserved amount of electrical power to be reserved for electrically charging the vehicle during the electrical charging event comprises:
    determining the amount of electrical power produced by the identified energy sources;
    determining the amount of power consumed by one or more identified energy consuming devices;
    if the amount of electrical power produced by the identified sources exceeds the amount of power consumed by the identified energy consuming devices, determining that the amount of electrical power generated by the identified energy sources to be reserved for charging the vehicle during the charging event is equal to the amount of power by which the electrical power produced exceeds the electrical power consumed; and
    if the amount of electrical power consumed by the identified energy consuming devices exceeds the amount produced by the identified energy sources, determining that the amount of electrical power generated by the identified energy sources to be reserved for charging the vehicle during the charging event is zero.

10. The method of claim 1, wherein determining the reserved amount of electrical power to be reserved for electrically charging the vehicle during the electrical charging event comprises identifying a hierarchy of the constraints and determining an amount of electrical power that can be reserved for charging the electric vehicle while enabling the hierarchy of constraints to be upheld.

11. The method of claim 1, the method further comprising:
    acquiring updated information pertaining to availability of the electrical power provided by the set of identified energy sources;
    determining, based on the updated information, an updated reserved amount of electrical power to be reserved for electrically charging the vehicle during the electrical charging event; and
    issuing instructions to implement a further electric charging procedure during the electrical charging event for providing power during the electric charging procedure at a power level that does not exceed the update reserved amount of electrical power.

12. The method of claim 11, wherein acquiring updated information pertaining to the amount of energy available from the identified energy sources is performed responsive to determining that a condition is met from the group of conditions consisting of: a period of time has passed since information pertaining to the amount of energy available from the identified energy sources was acquired and a notification that a change has occurred in the amount of energy available from the identified energy sources has been received.

13. A non-transitory computer readable medium configured to store computer executable instructions for using electrical power provided by a set of identified electrical energy sources to electrically charge an electric vehicle, the instructions comprising instructions for:
    determining, at a computer readable medium, that the electric vehicle is connected to an electric vehicle charging device;
    acquiring, from a computer readable medium, information pertaining to availability of electrical power provided by the set of identified energy sources;
    determining constraints on electrically charging the electric vehicle during an electrical charging event;
    determining, based upon the constraints on electrical charging a reserved amount of electrical power to be reserved for electrically charging the vehicle during the electrical charging event; and
    issuing instructions to implement an electric charging procedure during the electrical charging event for proving power during the electric charging procedure at a power level that does not exceed the reserved amount of electrical power.

14. The computer readable medium of claim 13, wherein determining that the electric vehicle is connected to the electric vehicle charging device comprises receiving an indication that a vehicle is connected to a vehicle charging device from one of the group consisting of: a telematics unit in the vehicle, the charging device to which the vehicle is connected, and an electrical power metering device.

15. The computer readable medium of claim 14, wherein the electrical power metering device is a home energy management system (HEMS).

16. The computer readable medium of claim 13, wherein acquiring information pertaining to availability of the electrical power provided by the set of identified energy sources comprises receiving data pertaining to a present level of power consumption attributable to identified energy consuming devices and data pertaining to a present level of power production attributable to the identified energy sources.

17. The computer readable medium of claim 16, wherein the data pertaining to a present level of power consumption and the data pertaining to a present level of power production is received from a home energy management system (HEMS).

18. The computer readable medium of claim 13, wherein determining the reserved amount of electrical power to be reserved for electrically charging the vehicle during the electrical charging event comprises:
   determining the amount of electrical power produced by the identified energy sources;
   determining the amount of power consumed by one or more identified energy consuming devices;
   if the amount of electrical power produced by the identified sources exceeds the amount of power consumed by the identified energy consuming devices, determining that the amount of electrical power generated by the identified energy sources to be reserved for charging the vehicle during the charging event is equal to the amount of power by which the electrical power produced exceeds the electrical power consumed; and
   if the amount of electrical power consumed by the identified energy consuming devices exceeds the amount produced by the identified energy sources, determining that the amount of electrical power generated by the identified energy sources to be reserved for charging the vehicle during the charging event is zero.

19. The computer readable medium of claim 13, the instructions further comprising instructions for:
   acquiring updated information pertaining to availability of the electrical power provided by the set of identified energy sources;
   determining, based on the updated information, an updated reserved amount of electrical power to be reserved for electrically charging the vehicle during the electrical charging event; and
   issuing instructions to implement a further electric charging procedure during the electrical charging event for providing power during the electric charging procedure at a power level that does not exceed the updated reserved amount of electrical power.

20. A system for using electrical power provided by a set of identified electrical energy sources to electrically charge an electric vehicle, the system comprising:
   a server, configured to receive information indicating that the electric vehicle is connected to an electric vehicle charging device, to receive information pertaining to availability of the electrical power provided by the set of identified energy sources, to determine constraints on electrically charging the electric vehicle during an electrical charging event, to determine based upon the constraints on electrical charging, a reserved amount of electrical power to be reserved for electrically charging the vehicle during the electrical charging event, and to issue instructions to implement an electrical charging procedure during the electrical charging event for providing power during the electric charging procedure at a power level that does not exceed the reserved amount of electrical power;
   a telematics unit, configured to transmit information indicating that the electric vehicle is connected to the electric vehicle charging device and to receive instructions to implement the electric charging procedure at the electric vehicle; and
   a home energy management system (HEMS) configured to transmit information pertaining to the amount of energy available from the set of identified energy sources.

* * * * *